Dec. 1, 1959

R. H. CULLEN ET AL 2,915,323

END COUPLING FOR HOSE

Original Filed June 7, 1957

Roy H. Cullen
Leslie D. Richards
INVENTORS

BY Hayden & Pravel

ATTORNEYS.

United States Patent Office 2,915,323

Patented Dec. 1, 1959

1

2,915,323

END COUPLING FOR HOSE

Roy H. Cullen and Leslie D. Richards, Houston, Tex.; said Richards assignor to said Cullen Continuation of application Serial No. 664,230, June 7, 1957. This application February 3, 1959, Serial No. 790,857

10 Claims. (Cl. 285—149)

This invention relates to new and useful improvements in end couplings for hoses and the like.

This invention is an improvement on the invention set forth in our copending U.S. patent application, Serial No. 664,230.

An object of this invention is to provide a new and improved end coupling for a hose or the like having a plurality of layers of wires therewith, wherein said end coupling includes a new and improved means for securing said wires thereto so as to prevent relative rotation between said layers of wires when said layers are laid in opposite helical directions and when said layers generate opposite rotational forces as a resultant of tension or pulling forces applied to the wires.

A particular object of this invention is to provide a new and improved end coupling for a hose or the like having a plurality of layers of oppositely laid helical wires therewith, wherein said end coupling includes a tubular body and new and improved means for separately locking each layer to said tubular body, with one of said layers being locked directly on said tubular body and with the other of said layers being locked on a tapered sleeve which is longitudinally slidable on said body in splined engagement therewith so that both layers of the wires are locked to said tubular body to prevent rotation thereof relative to the body and to each other.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
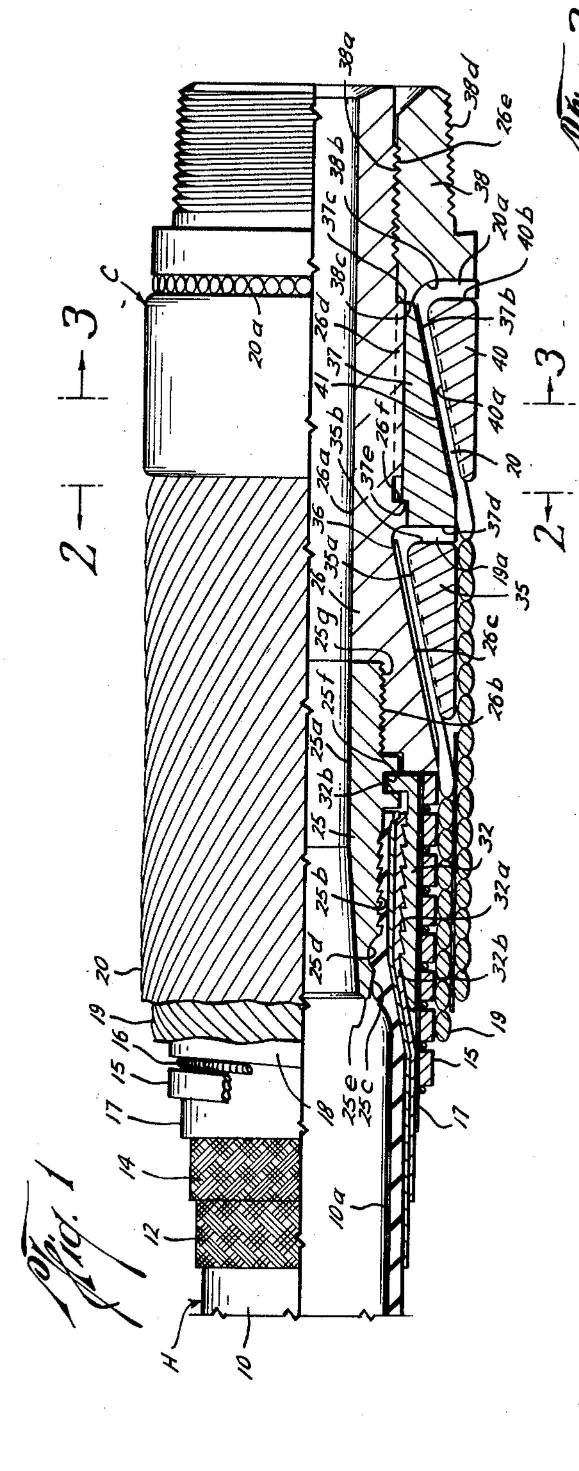
Fig. 1 is a view, partly in elevation and partly in section, illustrating the end coupling of this invention with a portion of a typical hose connected thereto.

In the drawings, the letter H designates generally a support or hose which is particularly suitable for supporting fluid-driven drill bits (not shown). At the end of each section of the flexible support or hose H, a coupling C is provided for connecting the lengths or sections of the support or hose H together to form a continuous support or hose which is adapted to be lowered into a well bore.

As illustrated in the drawings, the hose H includes an inner tube or fluid conductor 10 which is formed of rubber or any similar elastic resilient material and which serves as the main conduit through which the fluid flows during the use of the support or hose H. In order to provide for burst strength, the inner tube or flow conductor 10 is

2 surrounded by wire braid layers 12 and 14, each of which is of conventional construction. A coil spring 15 surrounds the wire braid layer 14 and such spring 15 is formed of metal and is wound in a right-hand direction, with filler material 16 laid between the layers making up the coil 15. Although the coil 15 is preferably made up of a resilient substantially rigid metal, it can be formed of other materials so long as they are sufficient to prevent crushing or collapsing of the coil 15 when the hose H is curved or bent around a drum or other supporting surface.

The coil spring 15 is surrounded by a plurality of helically wound wires 19 which extend in a right-hand direction and which are provided primarily for end pull strength. Such wires 19 are wound at an angle of about 30° with respect to the vertical axis or longitudinal axis of the support or hose H. The second outer layer of wires 20 surrounds the first outer layer of wires 19 and such wires 20 extend at an angle of about 30° with respect to the vertical or longitudinal axis of the hose H, but in a left-hand direction so that they are helically laid at an opposite helical angle from the wires 19. The wires 20 provide for end pull strength, but they also provide for torque resistance.

A layer 17 which is formed of rubber or plastic is preferably interposed between the coil 15 and the wire braid layer 14 to protect the wire braid 14 from corrosion. Also, a layer 18 of plastic or rubber may beinterposed between layers 15 and 19 to provide a better surface for applying the layer 19 in assembly. Only the two outer layers of wires 19 and 20 are utilized in the hose H, but an outer covering of rubber or similar resilient material could be included if desired. The coupling C of Fig. 1 includes a nipple 25, and a body section 26, which together constitute the tubular body of the coupling C. The central bores or passages *25a* and *26a* of the members 25 and 26, respectively, are in communication with the bore or interior *10a* of the tubular fluid conductor 10.

The fluid conductor 10 and the wire braid layers 12 and 14 are clamped on the nipple 25 by a compression sleeve 32 which has buttress teeth *32a* formed on the inner surface thereof for engagement with the layer 14 of the wire braid. The nipple 25 has similar buttress teeth *25b* formed on its external surface which engage the inner surface of the fluid conductor 10 so as to confine the ends of the conductor 10 and the wire braid layers 12 and 14 between the buttress teeth *25b* and *32a*. Considering the left-hand end of the coupling C (as viewed in Fig. 1 of the drawings) as the inner end thereof, it is to be noted that the nipple 25 has an upwardly and an inwardly tapered external end portion *25c* with an annular groove *25d* formed between the buttress teeth *25b* and the inner end *25e* of the nipple 25. The compression sleeve 32 has a downwardly and inwardly tapered surface which is substantially concentric with respect to the tapered end portion *25c*, although the end of the sleeve 32 preferably projects inwardly, or to the left as viewed in Fig. 1, more than the end portion *25c*. The internal diameter of the bore *10a* of the fluid conductor 10 is larger than the external diameter of the nipple 25 to provide for more efficient fluid flow through the hose H, so that in order to provide the end coupling C with the same external diameter as the hose H, the end of the conductor 10 is pulled inwardly and is therefore necked down when clamped between the nipple 25 and the compression ring 32. Because of the flared ends *25c* and *32b*, and the annular groove *25d*, the increased amount of rubber caused by such necking down at the end of the conductor 10 is confined tightly without creating a bulge beyond the inner end of the nipple 25. Additionally, the curved ball-like portion of rubber in the groove *25d* forms a tight seal to prevent leakage.

The compression sleeve 32 has an inwardly extending annular flange 32*b* which fits into a circumferential groove 25*f* formed on the external surface of the nipple 25 to thereby retain the sleeve 32 against longitudinal movement relative to the nipple 25. The sleeve 32 can be of any conventional type which is adapted to be compressed for applying a clamping action to the layers 10, 12 and 14, but preferably the sleeve 32 is a solid ring which is formed of metal or other material which retains itself in a compressed condition. For this purpose, the sleeve 32 would normally be applied in its clamped position prior to the addition of the layers 15, 16, 19 and 20 and the ring 32 would normally be swaged into the compressed clamping position prior to the addition of such layers 15, 16, 19 and 20.

The nipple 25 is formed with threads 25*g* on its external surface which are in threaded engagement with internal threads 26*b* formed on the inner enlarged diameter bore portion of the body section 26. The external surface of the body member 26 is tapered downwardly and inwardly with respect to the vertical or longitudinal axis of the hose H and the coupling C.

A coupling ring or compression ring 35 surrounds the coupling body section 26 and retains the ends of the plurality of wires in the layer 19 in a connected or attached position on the coupling body section 26. The coupling ring 35 is preferably swaged into position in the manner explained in connection with the corresponding element in the aforesaid patent application, but in any event, the coupling ring 35 is swaged into a compressed clamping engagement with the layer of wires 19. During the swaging of the ring 35, the inner surface thereof is embedded into the wires 19, or, stated differently, the wires 19 are embedded into the inner surface 35*a* of the coupling ring 35.

A layer of embedding material such as zinc 36 is provided on the inclined or tapered surface 26*c* in the usual case so as to embed the wires 19 therein during the swaging of the ring 35 into its connected position as shown in Fig. 1 of the drawings. To obtain maximum strength in the coupling C, the metal of the tubular body 26 is a relatively hard material which does not deform or change to any extent compared to the zinc 36 or other embedding material during the swaging of the ring 35 into its clamping position on the wires 19, and the zinc 36 or other similar embedding material is relatively soft compared with the metal or other material of the body section 26 so as to accomplish the embedding of the wires 19 into the embedding material 36, as previously pointed out.

Although zinc is the preferred material for the layer 36, it will be understood that other equivalent materials such as copper can be utilized. In actual practice, the zinc is applied in a molten state on the surface 26*c* and after the zinc hardens, it is preferably machined to form a smooth external surface upon which the wires 19 are positioned. Upon the swaging of the clamping or coupling ring 35, the wires 19 are embedded in the zinc 36 so that the zinc actually penetrates into the interstices or small longitudinal open areas between the wires 19. The zinc thus provides a strong metallic base in which the wires 19 are embedded so as to resist turning of the wires relative to the coupling body 26. It will thus be appreciated that any material which can be applied in a soft condition to the coupling body 26 and which is subsequently hardened at normal temperatures could function in place of the zinc, but such material cannot be a material which is subject to shearing or embrittlement or electrolytic decomposition since materials of that type would crack and shear if any appreciable load or torque is imparted to the wires 19.

To provide additional strength in the connection of the layer of wires 19 to the body 26, the outer ends 19*a* of the wires 19 may be bent upwardly and outwardly as shown in Fig. 1 adjacent to the outer end 35*b* of the coupling ring 35. A locking sleeve 37 which is mounted on the body 26 contacts the ends 19*a* of the wires 19 if such wires 19 are bent upwardly at the ends 19*a*; if the wires 19 are cut off at the lower end of the surface 26*c*, then the inner end of the sleeve 37 would preferably engage the end 35*b* of the ring 35. The sleeve 37 has internal splines 37*a* which interfit with external splines 26*d* on the body section 26 to permit longitudinal movement of the locking sleeve 37 relative to the body section 26 while preventing rotational movement therebetween. The locking sleeve 37 is held with its annular end 37*d* in firm gripping engagement with the ends 19*a* of the wires 19 and with the shoulder 37*e* in engagement with an annular shoulder 26*f* by an annular retaining nut 38, as will be more fully explained hereinafter. The nut 38 has internal threads 38*a* which are in threaded engagement with external threads 26*e* on the body section 26 so that the nut 38 can be rotated on the body 26 to urge the locking sleeve 37 longitudinally on the body 26 to clamp the ends 19*a* of the wires 19 in position as shown in Fig. 1.

The external surface 37*b* of the sleeve 37 is tapered downwardly and inwardly at substantially the same angle of incliniation as the surface 26*c* of the tubular body section 26. The layer of wires 20 are positioned on such inclined surface 37*b* and a swaged coupling ring 40 corresponding to the swaged coupling ring 35 is positioned in clamping engagement with the layer 20 of wires to hold such wires 20 on the sleeve 37. A layer 41 of relatively soft material such as zinc or copper to serve as an embedding layer corresponding to the embedding layer 36 is utilized for holding the wires 20 in the same manner as explained previously in connection with the embedding layer 36. Also, it should be pointed out that the inner surface 40*a* is deformed during the swaging operation to embed same around the layer of wires 20 in the same manner as previously described in connection with the couplingf ring 35 and the wires 19.

The outer ends 20*a* of the wires 20 may be bent upwardly and outwardly in the same manner as the ends 19*a* of the wires 19 so that the ends 20*a* are adjacent to the outer end 40*b* of the coupling ring 40. The inner end 38*b* of the annular nut 38 is preferably shaped or curved so as to substantially conform with the curvature of the ends 20*a* as best seen in Fig. 1 of the drawings so as to apply a squeezing action between the nut 38 and the coupling ring 40 on such ends 20*a* of the wires 20. If the wires 20 are not bent at the ends 20*a*, the surface 38*b* would be extended for contact with the surface 40*b*. A substantially radial annular shoulder or surface 38*c* is provided on the nut 38 for engagement with the annular lateral surface 37*c*. Therefore, in the usual case with the ends 20*a* bent as illustrated, the nut 38 serves the two-fold purpose of holding the ends of the wires 20 and at the same time the nut 38 holds the locking sleeve 37 so that it locks or holds the ends 19*a* of the wires 19 when the ends 19*a* are bent. If the ends 19*a* and 20*a* are not bent, the nut 38 still serves to hold the splined sleeve 37 with its shoulder 37*e* in contact with the shoulder 26*f* during the swaging of the ring 35, for a purpose to be hereinafter explained.

The annular nut 38 also has external threads 38*d* for making the connection with the adjacent end coupling which could be identical with the end coupling C illustrated in Fig. 1 except that the nut 38 in the adjacent end coupling would be formed as a female member rather than the male member.

In the assembly of the hose construction H on the end coupling C of this invention, the fluid conductor 10 and the metal braid layers 12 and 14 are initially positioned between the nipple 25 and the compression sleeve 32. The layer 15, the layer 19 and the layer 20, as well as the other layers externally of the layer 14 are preferably placed on the hose construction H subsequently to the clamping of the layers 10, 12 and 14 between the nipple 25 and the compression sleeve 32. The compression sleeve 32 is compressed into clamping engagement by a radial compressive force in the usual swaging procedure. Thereafter, the layer 17, the coil spring 15, the separating material 16 and the layer 18 are positioned on the hose construction H. The coupling body section 26 may be connected to the nipple 25 at that time by the threaded engagement of the threads 25*g* and 26*b*, if such connection has not been previously established. Then, the layer of wires 19 are wrapped over the plastic material 18 or any other suitable layer of material similar to plastic and the ends of the layer of wires 19 are laid on the external surface 26*c*. If the zinc or other embedding material 36 is utilized, the wires 19 are placed thereon. The extreme ends 19*a* should project beyond the surface 26*c*. The ring 35 is next moved longitudinally over the wires 19 so as to surround the body 26 adjacent the inclined surface 26*c*. At this point, the ends 19*a* of the wires 19 may either be bent upwardly and outwardly or they may be cut off to terminate at substantially the lower end of the tapered surface 26*c*, but preferably the ends 19*a* are bent as illustrated in Fig. 1 to obtain additional strength in the final connection of the wires 19.

Figure 3:
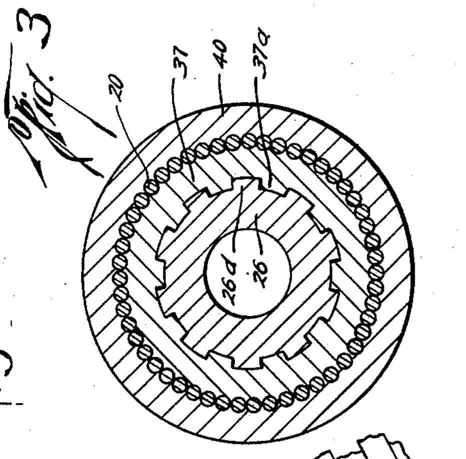
Fig. 3 is a sectional view taken on line 3—3 of Fig. 1.
Figure 4:
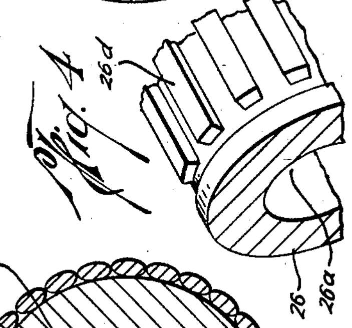
Fig. 4 is an isometric view showing a portion of the tubular coupling body of the end coupling of this invention.
Figure 2:
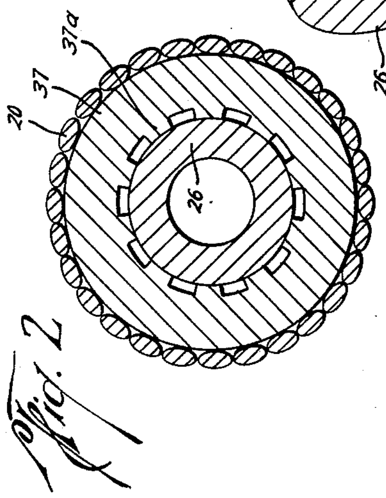
Fig. 2 is a sectional view taken on line 2—2 of Fig. 1.

The locking sleeve 37 is thereafter positioned on the body section 26 by sliding same longitudinally so that the splines 26*d* and 37*a* are interlocked as best seen in Fig. 3 of the drawings. The nut 38 is next threaded on the body 26 to force the shoulder 37*e* into contact with the shoulder 26*f*. The coupling ring 35 is then swaged by the usual swaging equipment to radially squeeze or compress same into clamping engagement with the wires 19 on the surface 26*c*; the ends 19*a* are tightly confined between the end 35*b* of the ring 35 and the annular lateral surface 37*d* of the sleeve 37 during such swaging operation. The nut 38 prevents any longitudinal movement of the sleeve 37 so that the shoulder 37*e* remains in contact with the shoulder 26*f*.

Thereafter, the nut 38 is removed, the wires 20 are laid in position with the end portions on the inclined surface 37*b*, and the ring 40 is slipped over the wires 20 to surround same adjacent the surface 37*b*. The ends 20*a* are then bent upwardly and outwardly in the preferred form of the invention. The nut 38 is again positioned on the body 26 with the annular lateral surfaces 37*c* and 38*c* in contact and with the shoulders 37*e* and 26*f* in contact. The ring 40 is then swaged to tightly clamp the wires 20 on the sleeve 37. The ends 20*a* are also tightly clamped between the ring 40 and the nut 38. The coupling C is thus completely connected to the hose H and is ready for use.

In use, when the hose H is subjected to longitudinal pulling or tension forces, the wires 19 and 20 have a tendency to straighten from their helical wraps to align themselves longitudinally rather than helically, but with the present construction such tendency to straighten is prevented, and at the same time, a relative rotation of any of the parts holding the wires 19 and 20 is prevented. Such results are made possible by this construction because when the wires 19 and 20 are subjected to a longitudinal force, the rotational force transmitted to the body 26 through the wires 19 is in one rotational direction (counterclockwise as viewed from the right-hand end of Fig. 1) and the rotational force transmitted to the body 26 from the wires 20 is in the opposite rotational direction (clockwise as viewed from the right-hand end of Fig. 1). The rotational force on the wires 20 is transmitted through the locking sleeve 37 to the body 26 since the sleeve 37 is locked to the body 26 by the splines 26*d* and 37*a*. The engagement of the shoulders 37*e* and 26*f* prevents the transfer of the tension force acting on the wires 20 and the sleeve 37 to the ring 35 and the wires 19 because such contact of the shoulders 37*e* and 26*f* prevents longitudinal shifting of the sleeve 37 on the body 26 towards the ring 35. Therefore, the wire layers 19 and 20 are equally loaded but are held against turning or rotational movement with respect to the body section 26 and with respect to each other.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An end coupling for a hose or the like having a plurality of layers of wire therewith, comprising a tubular coupling body having a longitudinal opening therethrough and an external surface which is tapered downwardly and outwardly with respect to the end of the hose to which the coupling is attached, a first layer of said wires helically laid on said external tapered surface, a first swaged coupling ring surrounding said first layer of said wires and clamping said first layer of wires to said tubular body so that rotational forces acting on said first layer of wires are transmitted to said tubular body in one rotational direction, an externally tapered sleeve surrounding said tubular coupling body and slidable relative thereto, coacting splines on said tubular coupling body and said tapered sleeve for preventing relative rotational movement therebetween while permitting said sliding movement of said locking sleeve on said tubular coupling body, the external surface of said sleeve being tapered downwardly and outwardly with respect to the end of the hose, a second layer of said wires helically laid on said externally tapered surface of said sleeve in an opposite helical direction from said first layer of wires, a second swaged coupling ring surrounding said second layer of said wires and clamping said second layer of wires to said sleeve so that rotational forces acting on said second layer of wires are transmitted to said sleeve and thereby to said tubular body in a rotational direction opposite to said first layer of wires, and an annular retaining nut secured on said tubular body in engagement with said tapered sleeve for preventing longitudinal movement of said tapered sleeve, whereby the rotational forces acting on the first and second layers of wires are both transmitted to said tubular body to prevent relative rotation of said layers of wires relative to each other when a longitudinal force is applied thereto.

2. The structure set forth in claim 1, wherein said externally tapered sleeve has a shoulder in engagement with a shoulder on said tubular body for preventing longitudinal movement of said sleeve relative to said tubular body and towards said first swaged coupling ring to thereby prevent the transmission of tension forces acting on said second layer of wires to said first coupling ring.

3. The structure set forth in claim 1, wherein the ends of the wires in said first layer of wires are bent upwardly and outwardly and are tightly clamped between said first swaged coupling ring and said sleeve to provide additional strength in the connection of said first layer wires to said coupling.

4. The structure set forth in claim 1, wherein the ends of the wires in said second layer of wires are bent upwardly and outwardly and are tightly clamped between said second swaged coupling ring and said annular nut to provide additional strength in the connection of said second layer of wires to said coupling.

5. The structure set forth in claim 1, wherein the ends of the wires in said first layer of wires are bent upwardly and outwardly and are tightly clamped between said first swaged coupling ring and said sleeve to provide additional strength in the connection of said first layer wires to said coupling, and wherein the ends of the wires in said second layer of wires are bent upwardly and outwardly and are tightly clamped between said second swaged coupling ring and said annular nut to provide additional strength in the connection of said second layer of wires to said coupling.

6. The structure set forth in claim 1, including a layer of embedding material on said external surface of said tubular coupling body which is softer than said external surface and said wires, and said first layer of wires being embedded in said embedding material to restrain said first layer of wires from sliding in a rotational direction relative to said tubular coupling body.

7. The structure set forth in claim 1, wherein said hose has a flexible tubular conductor internally of said plurality of layers of wires, and wherein said end coupling has means connected to said tubular coupling body and said flexible tubular conductor for securing said flexible tubular conductor to said tubular coupling body.

8. The structure set forth in claim 1, including a layer of embedding material on said external surface of said tubular coupling body which is softer than said external surface and said wires, said first layer of wires being embedded in said embedding material to restrain said first layer of wires from sliding in a rotational direction relative to said tubular coupling body, a layer of embedding material on said sleeve which is softer than said external surface of said sleeve and the wires thereon, and said second layer of wires being embedded in said embedding material to restrain said second layer of wires from sliding in a rotational direction relative to said tubular coupling body.

9. The structure set forth in claim 1, including a connecting tubular nipple adapted to receive a flexible tubular conductor portion of said hose thereon, means connecting said nipple to said tubular coupling body, and a compression sleeve surrounding said nipple with an end of said tubular conductor clamped therebetween, said nipple having an upwardly and inwardly extending external taper at its inner end and an annular groove adjacent thereto for securely holding said tubular conductor and for creating a fluid-tight seal with said conductor at said annular groove.

10. The structure set forth in claim 9, wherein said nipple has a smaller external diameter than the internal diameter of said conductor throughout its length except at the end portion of the conductor surrounding said nipple, said end portion being compressed inwardly into contact with said nipple by said compression ring, and wherein said compression sleeve has an inwardly and downwardly extending tapered internal surface surrounding said taper on said nipple to provide for tightly clamping said tubular conductor without creating a bulge in said conductor beyond said nipple.

References Cited in the file of this patent

UNITED STATES PATENTS 2,410,600 Cowles ---------------- Nov. 5, 1946